(12) United States Patent
Fong et al.

(10) Patent No.: US 8,417,202 B1
(45) Date of Patent: Apr. 9, 2013

(54) CIRCUITS, ARCHITECTURES, APPARATUSES, SYSTEMS, ALGORITHMS, METHODS AND SOFTWARE FOR ON-CHIP GAIN CALIBRATION

(75) Inventors: Neric Fong, Hong Kong (HK); Sang Won Son, Palo Alto, CA (US)

(73) Assignee: Marvell International Ltd., Hamilton (BM)

( * ) Notice: Subject to any disclaimer, the term of this patent is extended or adjusted under 35 U.S.C. 154(b) by 201 days.

(21) Appl. No.: 12/875,890

(22) Filed: Sep. 3, 2010

Related U.S. Application Data

(60) Provisional application No. 61/239,620, filed on Sep. 3, 2009.

(51) Int. Cl.
*H04B 17/02* (2006.01)

(52) U.S. Cl.
USPC ........... 455/136; 455/130; 455/137; 455/138; 455/144; 375/316; 375/344; 375/345

(58) Field of Classification Search ........... 455/130, 455/131, 136, 137–138, 144, 219, 222, 232.1, 455/234.1, 245.1, 251.1, 252.1; 375/316, 375/344, 345
See application file for complete search history.

(56) References Cited

U.S. PATENT DOCUMENTS

| | | | | |
|---|---|---|---|---|
| 4,752,949 A * | 6/1988 | Steinbeck et al. | ........... | 455/74.1 |
| 6,204,882 B1 * | 3/2001 | Sowig | ........... | 348/380 |
| 8,014,719 B2 * | 9/2011 | Moloudi et al. | ........... | 455/20 |
| 2002/0123372 A1 * | 9/2002 | Kobayakawa | ........... | 455/562 |
| 2003/0071697 A1 * | 4/2003 | Souetinov et al. | ........... | 333/81 R |
| 2004/0110534 A1 * | 6/2004 | Chung et al. | ........... | 455/561 |
| 2010/0056084 A1 * | 3/2010 | Sorrells et al. | ........... | 455/118 |

OTHER PUBLICATIONS

J. Wayde Allen; "Gain Characterization of the RF Measurement Path"; Publication No. TR-04-410; Publication Date: Feb. 2004; 18 Pages; U.S. Department of Commerce; United States.

* cited by examiner

*Primary Examiner* — Tuan Pham

(57) ABSTRACT

Circuits, architectures, a system and methods for providing on-chip gain calibration. The circuit generally includes a receiver comprising (i) a resistor on a semiconductor substrate, the resistor configured to provide a signal having a noise component that varies with temperature, and (ii) an amplifier circuit on the semiconductor substrate coupled to the resistor, the amplifier circuit configured to receive the signal and provide a second signal having an amplitude greater than the first signal. The architectures and/or systems generally include those that embody one or more of the inventive concepts disclosed herein. The method generally includes (i) providing a noise signal from a resistor to an amplifier, the resistor being on a common semiconductor substrate with the amplifier, (ii) determining a resistance value of the resistor, (iii) determining an impedance at an input of the amplifier, and (iv) determining a gain of the amplifier.

10 Claims, 6 Drawing Sheets

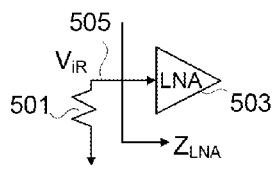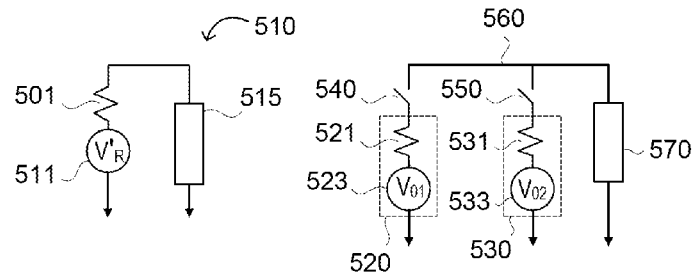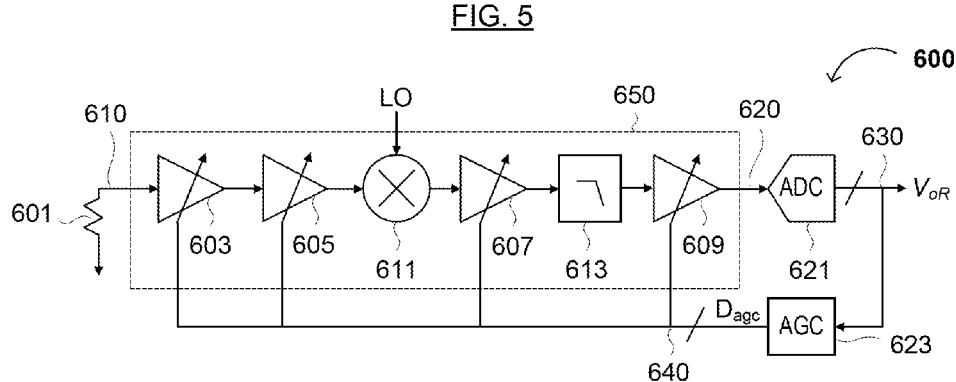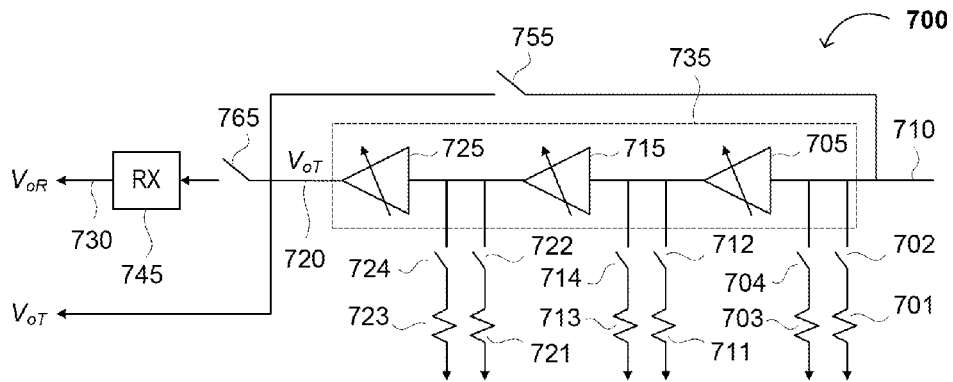

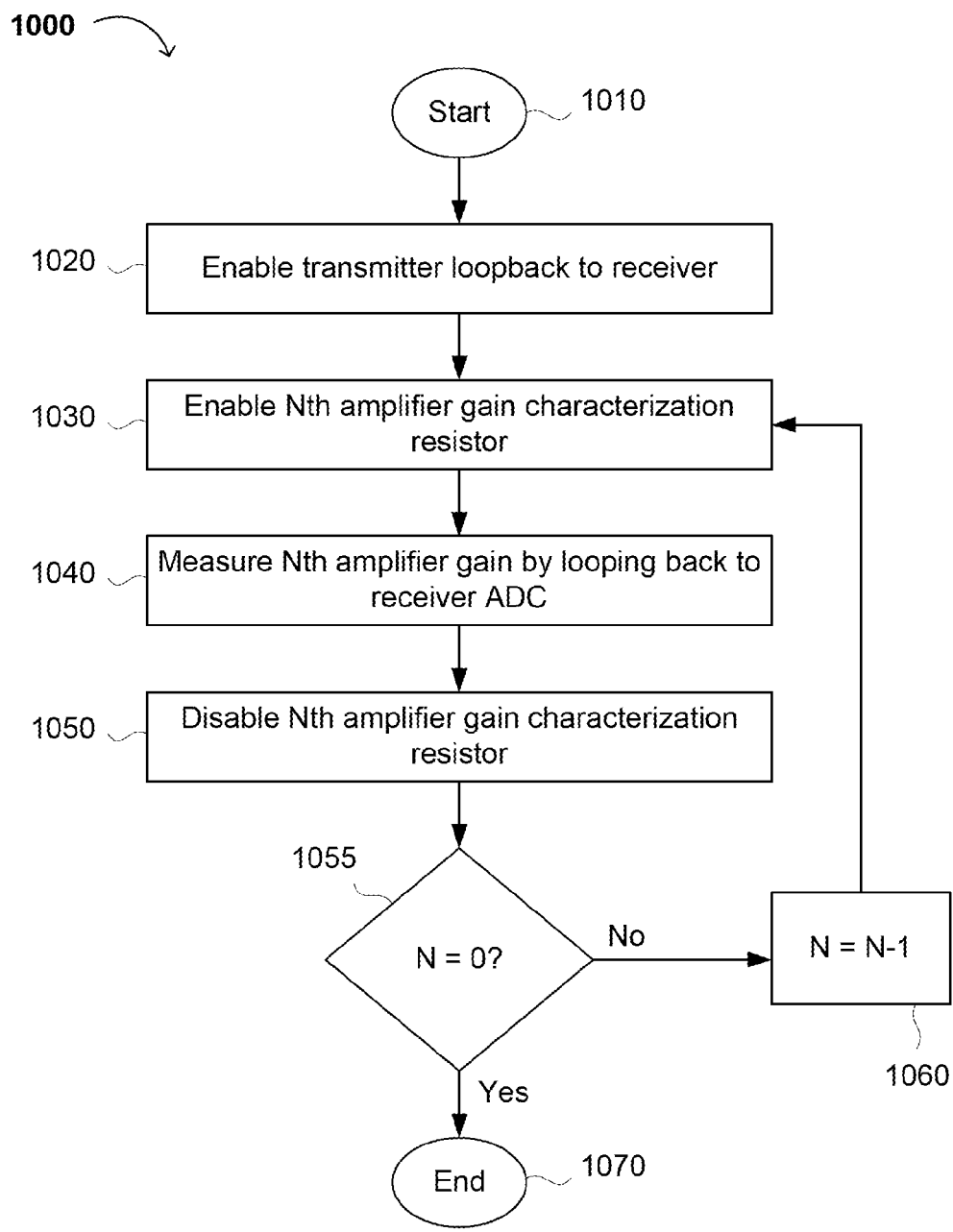

CIRCUITS, ARCHITECTURES, APPARATUSES, SYSTEMS, ALGORITHMS, METHODS AND SOFTWARE FOR ON-CHIP GAIN CALIBRATION

RELATED APPLICATIONS

This application claims the benefit of U.S. Provisional Patent Application No. 61/239,620, filed Sep. 3, 2009, incorporated herein by reference in its entirety.

FIELD OF THE INVENTION

The present invention generally relates to the field of transmitter and receiver gain calibration. More specifically, embodiments of the present invention pertain to circuits, architectures, systems, methods, and algorithms for receiver and/or transmitter gain calibration using an on-chip resistor.

BACKGROUND

Conventional transmitters and receivers employ a plurality of serially connected digital and/or analog components to propagate or receive, respectively, an electromagnetic signal. As illustrated in FIGS. 1A and 1B, respectively, conventional transmitter chain 100 and conventional receiver chain 200 each comprise a plurality of digital and analog components (e.g., a low-noise amplifier [LNA], a variable-gain amplifier [VGA], a base-band amplifier [BBA], a multiplier or mixer, a low-pass filter [LPF], etc.) configured to transmit or receive an RF signal. As illustrated in transmitter chain 100 of FIG. 1A, a first VGA 110 receives an externally provided input reference signal $V_{iT}$ at baseband (BB) and provides a gain adjusted signal to multiplier\mixer 130. In conventional transmitter chains, $V_{iT}$ can be provided, for example, by a known baseband (BB) signal (not shown). Multiplier 130 receives an output signal from VGA 110 and an input signal from a local oscillator (LO; not shown) and provides an output signal to a second VGA 112. The output of second VGA 112 is then provided (directly or indirectly) to an $n^{th}$ VGA 114, which provides output signal $V_{oT}$.

As illustrated, the plurality of VGAs (e.g., 110, 112, and 114) and the multiplier and\or mixer (i.e., multiplier 130) are serially coupled or connected. Generally, the transmitter chain 100 can comprise n serially coupled or connected amplification devices (e.g., VGAs 110, 112, and 114 of FIG. 1A), where n is a positive integer greater than or equal to 1. Utilizing an output signal (e.g., $V_{oT}$ provided by $n^{th}$ VGA 114 of FIG. 1A), the voltage gain ($G_T$) of the transmitter chain 100 can be calculated according to Equation [1] below:

$$G_T = V_{oT}/V_{iT} \quad [1]$$

where $V_{oT}$ is the voltage at an output 140 from an $n^{th}$ VGA (e.g., VGA 114 of FIG. 1A) and $V_{iT}$ is the known voltage of an internally and externally provided baseband (BB) reference signal (e.g., $V_{iT}$ of FIG. 1A). Thus, once $V_{oT}$ is determined, the gain $G_T$ of the transmitter 100 can be calculated.

Similarly, as illustrated in receiver chain 200 of FIG. 1B, an input RF reference signal $V_{iR}$ is provided to first VGA 210 at node 220 and processed by receiver chain 200 (e.g., VGAs 210, 212, and 214, and multiplier and\or mixer 230). A gain-adjusted output signal $V_{oR}$ is then provided by $n^{th}$ VGA 214 at node 240. As illustrated, the amplification devices (e.g., VGAs 210, 212, and 214) are serially coupled or connected. By utilizing an output signal (e.g., $V_{oR}$ provided by $n^{th}$ VGA 214 of FIG. 1B), a voltage gain ($G_R$) of the receiver chain 200 can be calculated according to Equation [2] below:

$$G_R = V_{oR}/V_{iR} \quad [2]$$

where $V_{iR}$ is the known voltage of an externally provided RF reference signal (e.g., $V_{iR}$ of FIG. 1B) at node 220, and $V_{oR}$ is the voltage at an output 240 provided by an $n^{th}$ VGA (e.g., VGA 207 of FIG. 1B) at a baseband (BB) frequency. Thus, once $V_{oR}$ is known, the gain $G_R$ of the receiver can be calculated.

As discussed above, to properly characterize the gain of a conventional transmitter and receiver chain (e.g., transmitter chain 100 and receiver chain 200 of FIGS. 1A and 1B, respectively), a first external device (e.g., an RF signal generator) provides an RF reference signal ($V_{iR}$) for receiver gain characterization, and a second external device (e.g., a power meter, a spectrum analyzer, etc.) measures the voltage of the RF output signal of the transmitter ($V_{oT}$). Gain characterization is necessary because conventional transmitters and receivers have component-dependent and temperature-dependent variations in the gain of each amplifier in the chain. For example, if a conventional CMOS amplifier has a gain of 10 dB with a possible variation of ±2 dB, the gain of the amplifier can range from 8 dB to 12 dB. Similar gain variations can also occur in other devices in the transmitter or receiver chain. Additionally, since several components (e.g., amplifiers) in a receiver or transceiver chain are cascaded together, the gain and its variation can be compounded. For example, if a receiver is designed to provide a 30 dB gain, a receiver chain comprising three 10 dB amplifiers with a ±2 dB gain variation will have a 30 dB gain with a variation of ±6 dB. Thus, the total gain from amplifier to amplifier can range from 24 dB to 36 dB. Therefore, gain characterization is required for the amplifier to achieve the target (or required) gain accuracy.

Furthermore, since the gain of such chains typically varies with respect to an input power level, the power of the input signal is typically swept to accurately determine the gain characteristics of the transmitter and receiver chains 100 and 200, respectively, at various signal input levels. Such gain measurements, however, can consume substantial amounts of time to test both the transmitter and receiver chains (a variable cost), and to setup the test procedure and environment (a fixed cost). Short test times, and reduced setup times and equipment costs, may be beneficial or critical. In addition, conventional methods of gain calibration may also be compromised by test signal imperfections (e.g., reference signal fluctuations, noise, etc.) as well as variations in the calibration equipment itself.

In receiver chains comprising VGAs (e.g., receiver chain 200 in FIG. 1B), the gain of at least one of the VGAs is programmed to obtain the desired receiver gain. For example, if a receiver chain is to provide a 30 dB gain, when the receiver chain 200 is 28 db, an amplifier in the receiver chain can be programmed or adjusted to add 2 dB of gain to it. Conventional methods of programming such VGA(s) utilize calibration during manufacturing. Specifically, a known reference signal (e.g., signal $V_{iR}$ in FIG. 1B) is provided (e.g., by an RF signal generator) to an input of the receiver chain 200, and the output is measured, utilizing an on-chip ADC, to obtain the gain of the receiver chain 200. The VGA(s) are then adjusted until the desired output gain is provided.

This "Background" section is provided for background information only. The statements in this "Background" are not an admission that the subject matter disclosed in this "Background" section constitutes prior art to the present disclosure, and no part of this "Background" section may be used as an admission that any part of this application, including this "Background" section, constitutes prior art to the present disclosure.

SUMMARY

Embodiments relate to circuitry, architectures, systems, methods, algorithms and software for transceiver gain calibration. The circuitry generally comprises (i) a semiconductor substrate, (ii) a first resistance element on the semiconductor substrate, the first resistance element configured to provide a first signal, the first signal having a noise component that varies with temperature, and (iii) an amplifier on the semiconductor substrate configured to receive the first signal and provide a second signal, the second signal having an amplitude greater than the first signal. The amplifier is also generally configured to receive an analog input signal (e.g., an RF signal received by an antenna coupled to an input to the amplifier, a data signal from a storage channel, etc.). The architectures and/or systems generally comprise those that include a circuit embodying one or more of the inventive concepts disclosed herein.

The method of receiver calibration generally comprises (i) providing a first signal from a first resistance element to an amplifier, the first resistance element being on a common semiconductor substrate as the amplifier, (ii) determining a resistance value of the first resistance element, (iii) determining an impedance at an input of the amplifier, and (iv) determining a gain of the amplifier. The method of transmitter gain calibration generally comprises (i) determining a gain of a receiver amplifier, (ii) providing a reference signal to a transmitter amplifier, the reference signal coming from the receiver amplifier or a resistance element, and the resistance element being on a common semiconductor substrate with the transmitter amplifier, (iii) determining a resistance value of the resistance element when the reference signal comes from the resistance, (iv) determining an impedance at an input node of the transmitter amplifier, (v) determining a total gain of the transmitter amplifier and the receiver amplifier, and (vi) removing the gain of the receiver amplifier from the total gain to determine the gain of the transmitter amplifier. A further aspect of the invention relates to algorithms and/or software that implement the above method(s).

The present disclosure advantageously provides a method of on-chip gain calibration that avoids the disadvantages associated with conventional methods of calibrating gain during manufacturing. Additionally, the present disclosure advantageously provides a method of gain calibration whereby all or substantially all gain calibration measurements can be performed on-chip, thus providing a fast, reliable ATE setup time without use of external test/measurement equipment, even in high noise, low gain environments. Furthermore, the present disclosure provides a circuit for transceiver gain calibration, wherein the effects of temperature do not significantly affect gain calibration. These and other advantages of the present disclosure will become readily apparent from the detailed description of preferred embodiments below.

BRIEF DESCRIPTION OF THE DRAWINGS

FIG. 4A is a diagram showing an interface between an on-chip resistor and a low-noise amplifier according to the embodiment of FIG. 2.

FIG. 4B is a diagram illustrating an alternative representation of the circuit of FIG. 4A.

FIG. 4C is a diagram illustrating a circuit using first and second on-chip resistors to provide a reference signal to the impedance element of FIG. 4B.

FIG. 5 is a diagram showing a second embodiment of the present circuit, further including automatic gain control (AGC).

FIG. 6 is a diagram showing a third embodiment of the present circuit including a loopback from the receiver to the transmitter.

FIG. 9 is a flow diagram showing a second method of on-chip gain calibration suitable for determining a transmitter amplifier gain.

DETAILED DESCRIPTION

Figure 1A:
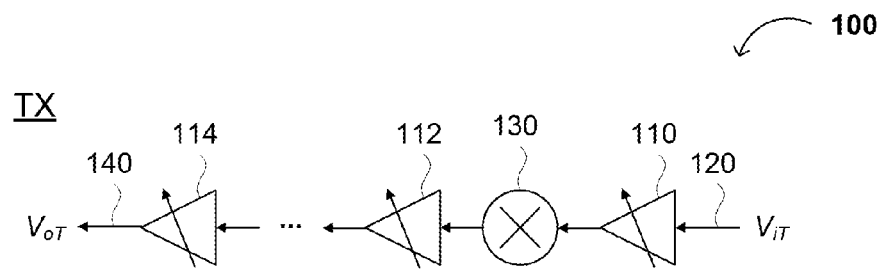
FIG. 1A is a diagram showing a conventional transmitter chain.

Reference will now be made in detail to various embodiments of the invention, examples of which are illustrated in the accompanying drawings. While the invention will be described in conjunction with the embodiments provided below, the embodiments are not intended to limit the invention. On the contrary, the invention is intended to cover alternatives, modifications and equivalents that may be included within the scope of the invention as defined by the appended claims. Furthermore, in the following detailed description of the present invention, numerous specific details are set forth in order to provide a thorough understanding of the present invention. However, the present invention may be practiced without these specific details. In other instances, well-known methods, procedures, components, and circuits have not been described in detail so as not to unnecessarily obscure aspects of the present invention.

Some portions of the detailed descriptions which follow are presented in terms of processes, procedures, logic blocks, functional blocks, processing, and other symbolic representations of operations on data bits, data streams or waveforms within a computer, processor, controller and/or memory. These descriptions and representations are generally used by those skilled in the data processing arts to effectively convey the substance of their work to others skilled in the art. A process, procedure, logic block, function, operation, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer, data processing system, or logic circuit. It has proven convenient at times, principally for reasons of common usage, to refer to these signals as bits, waves, waveforms, streams, values, elements, symbols, characters, terms, numbers, or the like.

All of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "operating," "computing," "calculating," "determining," or the like, refer to the action and processes of a computer, data processing system, logic circuit or similar processing device (e.g., an electrical, optical, or quantum computing or processing device), that manipulates and transforms data represented as physical (e.g., electronic) quantities. The terms refer to actions, operations and/or processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

Furthermore, for the sake of convenience and simplicity, the terms "connected to," "coupled to," and "in communication with" (which terms also refer to direct and/or indirect relationships between the connected, coupled and/or communication elements unless the context of the term's use unambiguously indicates otherwise) may be used interchangeably, but these terms are also generally given their art-recognized meanings.

The present invention concerns circuits, architectures, systems, methods, algorithms and software for on-chip gain calibration. The invention, in its various aspects, will be explained in greater detail below with regard to exemplary embodiments.

A Circuit and/or Architecture for On-Chip Gain Calibration

Figure 2:
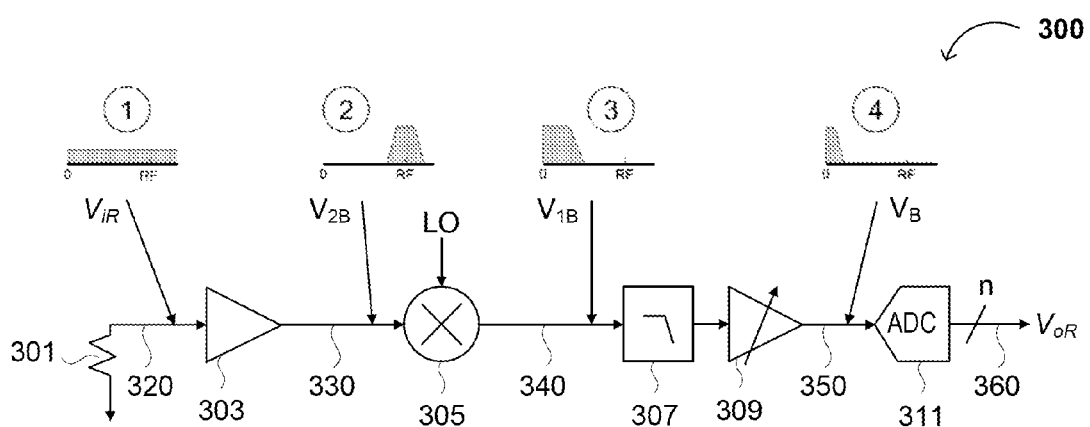
FIG. 2 is a diagram showing a first embodiment of the present circuit.

FIG. 2 illustrates a first receiver 300 according to a first embodiment. An on-chip resistor 301 provides a signal $V_{iR}$ to an amplifier (e.g., LNA 303) at node 320, where $V_{iR}$ is a broadband, white/thermal noise signal with a frequency spectrum as shown in ①. The on-chip resistor 301 is not limited to being a resistor. For example, on-chip resistor 301 may comprise any passive element comprising a resistance value and configured to provide a reference signal having a noise component that varies with temperature (e.g., a "resistive element," such as a diode, a "leaker" transistor [e.g., having a gate receiving a fixed voltage, such as a power supply or bias voltage], etc.). In any case, the on-chip resistor 301 is on the same semiconductor substrate (e.g., single-crystal silicon chip or other monolithic semiconductor die) as the amplifiers in receiver 300 in FIG. 2.

The noise power spectral density ($N_R$) of the signal at node 320 ($V_{iR}$) can be calculated according to Equation [3] below:

$$N_R = 4kTR \quad [3]$$

where k is Boltzman's constant (i.e., $1.380 \times 10^{-23}$ J/K), T is the temperature of the chip, and R is the value of the on-chip resistance (in Ohms). Although the signal name "$V_{iR}$" on its face may appear to denote a voltage of the receiver input signal in the time domain, the term "4kTR" is the power density in the frequency domain (in Watts/Hz). The temperature of the chip will increase as the chip reaches its steady-state operating temperature, but is generally designed to be within a predetermined operating range, depending on manufacturing specifications. The resistance value of the on-chip resistor is generally dependent upon the chip temperature T.

LNA 303 amplifies the input signal at node 320 and provides a band-limited signal $V_{2B}$ (e.g., having a frequency spectrum exemplified at ②) to multiplier and\or mixer 305 at node 330. When the input signal is an RF signal, as illustrated in frequency spectrum ①, signal $V_{2B}$ has a bandwidth $2B_{RF}$, as illustrated in frequency spectrum ②. Multiplier 305 receives signal $V_{2B}$ at node 330 and a periodic signal LO from a local oscillator (not shown), to down-convert signal $V_{2B}$ to a baseband signal $V_{1B}$ with a bandwidth $B_{RF}$ at node 340, as illustrated in frequency spectrum ③. Signal $V_{1B}$ at node 340 is then provided to a low-pass filter 307, which limits the bandwidth to a filtered bandwidth B, and the filtered signal is provided to variable-gain baseband amplifier (BBA) 309 to produce a signal at node 350 having a voltage $V_B$ as defined in Equation [5] below. When the BBA 309 input signal frequency spectrum is similar to that illustrated in frequency spectrum ③ (i.e., a baseband frequency), the output signal frequency spectrum provided at node 350 is similar to that illustrated in frequency spectrum ④. The power of the signal at node 350 can be calculated according to Equation [4] below:

$$p_{R4} = (G_{RF}G_{BB})^2 \int_0^B N_R \, df \approx N_R B(G_{RF}G_{BB})^2 = 4kTRB \cdot (G_{RF}G_{BB})^2 \quad [4]$$

where $G_{RF}$ is the gain of RF blocks (e.g., LNA 303 and mixer/multiplier 305), $G_{BB}$ is the gain of the baseband blocks (e.g., LPF 307 and BBA 309), $N_R$ is the power (in the frequency domain) of the signal $V_{iR}$ provided by on-chip resistor 301, and B is the bandwidth of the output signal from BBA 309 (i.e., $V_B$). Variables k, T, and R are defined in accordance with Equation [3] above. As indicated in Equation [4], the value of $G_{RF}G_{BB}$ is squared to convert the gain from a voltage calculation to a power calculation. Utilizing a voltage calculation, the voltage $V_B$ of the signal at node 350 can be calculated according to Equation [5] below:

$$V_B = \sqrt{p_{R4} \cdot Z_4} \quad [5]$$

where $Z_4$ is defined as the impedance seen at the output of BBA 309 (i.e., at node 350), and $p_{R4}$ is defined as the power of the signal at node 350, as determined in Equation [4]. ADC 311 receives the signal at node 350 from BBA 309 and provides digital output signal $v_{oR}$. If the resolution of ADC 311 is sufficient to provide an accurate digitized representation of signal $V_B$, then $v_{oR} = V_B$, and by combining Equations [4] and [5] above, the gain of the receiver chain $G_R$ can be calculated according to Equation [6] below:

$$G_R = G_{RF}G_{BB} = \sqrt{\frac{v_{oR}^2 / Z_4}{4kTRB}} \quad [6]$$

where $v_{oR}$ can be measured using the output of ADC 311 (from which the gain $G_R$ can be calculated digitally or with software according to Equation [6] above), T can be determined via an on-chip temperature sensor circuit, and B is defined by the bandwidth of the LPF 307. Thus, in one embodiment, the receiver of FIG. 2 further comprises circuitry (such as a temperature sensor; not shown) on the same chip (e.g., semiconductor die, which in one embodiment can be made from a single-crystal silicon substrate) configured to determine the temperature of the chip.

Figure 1B:
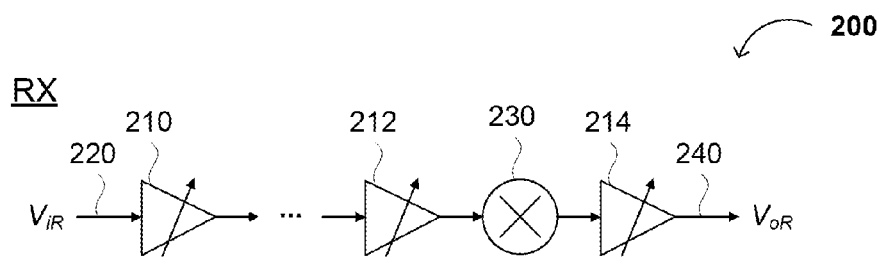
FIG. 1B is a diagram showing a conventional receiver chain.

As discussed above, the present architecture enables eliminating the use of external equipment and/or devices (e.g., a source of a reference signal, such as an RF signal generator or noise generator, or when the output of the ADC can be read from device pins or output terminals, a voltage meter). However, since the noise output of the on-chip resistor 301 is directly related to its resistance value, an accurate calculation of the on-chip resistor value is desirable for the gain calculation. Although it is not necessary to do so, the nominal or target resistance of the on-chip resistor 301 may be selected to substantially match the resistance component of the receiver chain input impedance (e.g., the input impedance of receiver chain 200 in FIG. 1B). To improve the accuracy of determining the actual resistance of the on-chip resistor 301, other parameters affecting the resistance are taken into consideration.

A first consideration is the effect of process variations on the value of the on-chip resistor 301. Thus, a further aspect of the invention relates to a receiver configured to provide a reference current to the on-chip resistor 301, to more accurately determine the resistance of the on-chip resistor 301, taking into account variables such as process variations.

Figure 3A:
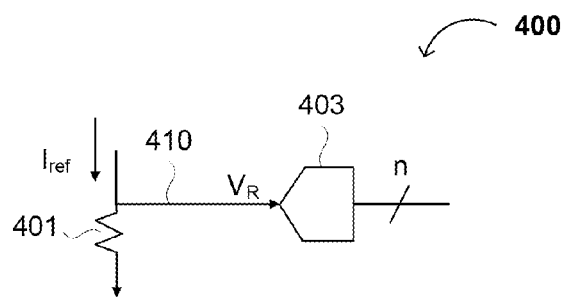
FIG. 3A is a diagram showing a circuit for measuring a value of an on-chip resistor.

FIG. 3A illustrates a voltage sampling circuit 400, wherein an on-chip resistor 401 is serially coupled to an analog-to-digital (ADC) converter 403 at node 410. On-chip resistor 401 provides a reference signal to ADC 403 at node 410, where $V_R$ is the voltage of the signal at node 410. Additionally, a reference current $I_{ref}$ is provided at node 410. Generally, reference current $I_{ref}$ can be provided by any circuitry in the receiver capable of providing a relatively stable current (e.g., an on-chip fixed current source). The resistance of the on-chip resistor 401 can be measured or calculated as a DC value, by utilizing $V_R$ and $I_{ref}$ (having a known value) from the voltage sampling circuit 400 of FIG. 4 (i.e., internal circuitry in the receiver).

Figure 3B:
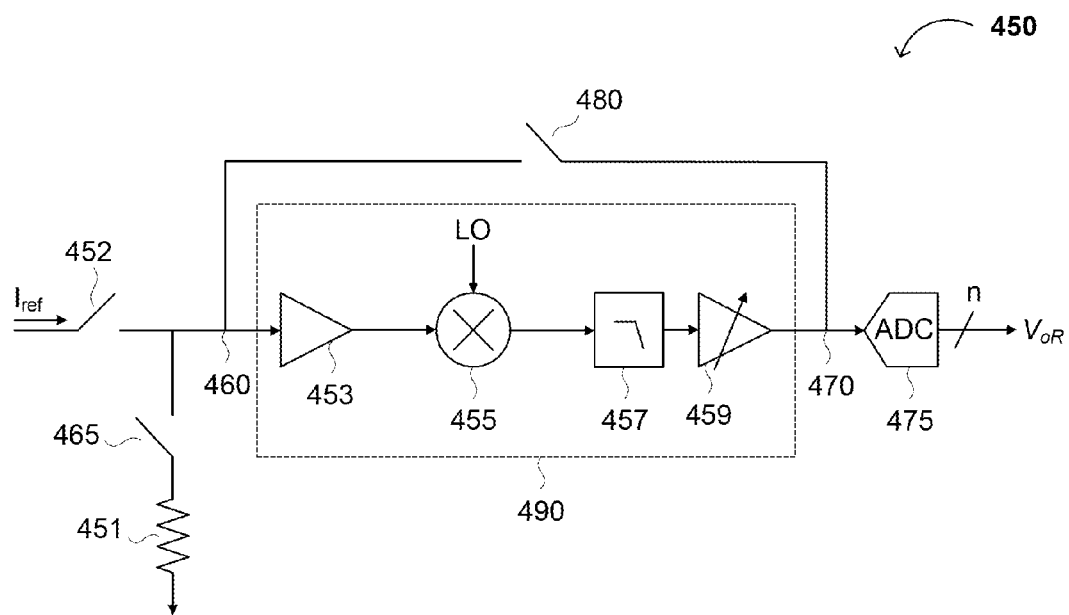
FIG. 3B is a more detailed diagram of the circuit of FIG. 3A.

FIG. 3B illustrates a voltage sampling circuit 450 that is coupled to a receiver chain 490 at nodes 460 and 470. Switch 452 allows the reference current $I_{ref}$ to be coupled to on-chip resistor 451 at node 460. The applied reference current $I_{ref}$ develops a voltage across the resistor 451 at node 460. Switch 480 allows the input to the receiver chain 490 at node 460 to bypass the receiver chain 490 (i.e., amplification devices 453 and 459) and be provided directly to the ADC 475 at node 470. The voltage developed at node 460 is then sampled by the ADC 475. In addition, switch 465 allows the resistor 451 to be disconnected from the receiver 450 after gain calibration. By bypassing the receiver chain 490 (i.e., by closing switch 480), nodes 460 and 470 become similar or equivalent to node 410 in FIG. 3A. Thus, by supplying a reference current to ADC 475, the resistance value of on-chip resistor 451 can be determined according to Ohm's law. Disconnecting switches 465, 480 and 452 disconnects the resistor 451, the reference current $I_{ref}$ and the bypass path, and enables normal operation of receiver chain 490. In one embodiment, switches 452, 465 and 480 each comprise one or more MOSFET transistors.

A second consideration is the input impedance of the receiver chain 300 (e.g., the impedance at the input of LNA 303 of receiver chain 300 in FIG. 2, or at the input of amplifier 453 of receiver chain 490 in FIG. 3B). Specifically, the power of a noise signal (e.g., $V_{iR}$ in FIG. 2 or $V_R$ in FIG. 3A) generated by the on-chip resistor 301 (FIG. 2) or 451 (FIG. 3B) may be distributed between the on-chip resistor and the amplifier at the input of the receiver (e.g., LNA 303 in FIG. 2, or LNA 453 in FIG. 3B). Additionally, a portion of the noise signal is generally dissipated in the on-chip resistor itself. Thus, to more accurately calculate the power of the noise signal provided to the receiver chain by the on-chip resistor and/or the impedance at the input to the receiver/amplifier chain, noise signal dissipation in the on-chip resistor should be considered.

As shown in FIG. 4A, on-chip resistor 501 is coupled to the input of LNA 503, where LNA 503 is the first stage (input) of a receiver chain (not shown), and $Z_{LNA}$ is the LNA impedance at node 505 (i.e., the input to LNA 503). An equivalent circuit model 510 is illustrated in FIG. 4B. Specifically, circuit model 510 comprises a serially connected noise voltage source 511 providing a noise signal $V_R$ and the resistor 501. To complete the on-chip resistance-LNA impedance model shown in FIG. 4A, resistor 501 of circuit model 510 is serially coupled to an impedance element 515 (e.g., representing the input impedance of LNA 503).

Utilizing the elements of circuit model 510, the power (or power density) $N_R$ of the noise signal generated by resistor 501 actually provided to the receiver chain can be calculated according to Equation [7] below:

$$N_R = 4kTR \cdot \left(\frac{Z_{LNA}}{R + Z_{LNA}}\right)^2 \quad [7]$$

where $Z_{LNA}$ is the impedance at the input of the receiver chain (e.g., the impedance at node 505 of FIG. 4A), R is the resistance value of resistor 501 (e.g., calculated by using the voltage sampling circuit of FIG. 3A), T is the temperature of the chip on which resistor 501 is located (e.g., as measured via an on-chip temperature sensor circuit), and k is defined in accordance with Equation [3] above.

Thus, utilizing Equation [7], a modified receiver gain, $G_R$ (i.e., the gain provided by the receiver from the noise signal at node 505 in FIG. 4A, less the noise power dissipated by or through resistor 501), can be calculated according to Equation [8] below:

$$G_R = \left(\frac{1}{\sqrt{R}} + \frac{\sqrt{R}}{Z_{LNA}}\right)\sqrt{\frac{v_{oR}^2/Z_A}{4kTB}} \quad [8]$$

where $Z_{LNA}$ is the impedance at the input of LNA 503 (e.g., the impedance of receiver chain 490 in FIG. 3B), R and T are as defined for Equation [7] above, $v_{oR}$ is the value of the receiver chain output signal (e.g., the voltage of the signal at node 470 in FIG. 3B), and k is as defined by Equation [3] above.

FIG. 4C shows circuitry that can be used to determine the impedance at the input of receiver chain 503 by utilizing Equations [6] and [8] above. As illustrated, the impedance at node 560 (e.g., impedance $Z_{LNA}$ of FIG. 4A) can be determined by sequentially coupling a first on-chip resistance element 520 (e.g., resistor 451 of FIG. 3B) and a second on-chip resistance element 530 to the receiver chain input node 560. As illustrated in FIG. 4C, on-chip resistance element 520 is represented by resistor 521 and voltage noise source 523, which provides a first voltage $V_{O1}$ to node 560 when switch 540 is closed and switch 550 is open. Similarly, on-chip resistance element 530 is represented by resistor 531 and voltage noise source 533, which effectively provides a second voltage $V_{O2}$ to node 560 when switch 550 is closed and switch 540 is open. On-chip resistance elements 520 and 530 are coupled in parallel at node 560. Generally, the resistances of resistors 521 and 531 differ. In one embodiment, the value of resistor 521 is about twice that of resistor 531.

Since $G_R$ and $Z_{LNA}$ are unknown variables in Equation [8] (after determining the values of other variables by using Equations [1]-[7] and the voltage sampling circuit of FIG. 3), by using parallel on-chip resistors (i.e., on-chip resistors 520 and 530) one can calculate two different values for $v_{oR}$ in Equation [8] above. Thus, by utilizing Equation [8] above with two values of R (and, in turn, two values of $v_{oR}$) provided by the parallel on-chip resistance elements (e.g., on-chip resistors 521 and 531 of FIG. 4C), one can derive two equations with two unknowns ($Z_{LNA}$ and $G_R$). By solving the equations, both $Z_{LNA}$ and $G_R$ can be determined.

A third consideration is the noise introduced by the receiver chain. Specifically, the above mentioned calculations assume that a relatively low noise signal is introduced by the receiver chain during processing of a reference signal (e.g., $V_{iR}$ of FIG. 4A). That is, the above calculations assume that the reference signal (e.g., thermal noise signal $V_{iR}$ of FIG. 1B) is provided substantially exclusively by an on-chip resistor (e.g., on-chip resistor 501 of FIG. 4A), and contributions from the receiver chain (e.g., receiver chain 200 of FIG. 1B) are insignificant. However, assuming the receiver chain introduces some noise, the resistance of the on-chip resistor can be increased to increase the amplitude of the noise signal (e.g., $V_{iR}$ of FIG. 1B) and, in effect, the signal-to-noise (SNR) ratio of the thermal noise signal $V_{iR}$. Therefore, the above calculations are accurate for amplifiers (e.g., LNAs) that provide high gain amplification in low noise environments, although the circuitry and calibration approach are not limited to amplifiers providing high gain amplification in low noise environments. Referring back to FIG. 3, after determining the gain of the receiver 490, resistor 451 can be disconnected from the input 460 to receiver 490 using switch 465.

A Second Circuit and/or Architecture for On-Chip Gain Calibration

FIG. 5 illustrates a second receiver 600 comprising automatic gain control (AGC) circuitry. Similar to receiver 300 of FIG. 2, circuit 600 of FIG. 5 comprises an on-chip resistor 601 that provides a noise signal to receiver chain 650. Specifically, receiver chain 650 receives the noise signal at node 610 from on-chip resistor 601. Receiver chain 650 comprises a plurality of amplifiers (e.g., variable-gain amplifiers [VGAs] 603, 605, 607, and 609, multiplier and\or mixer 611, and low-pass filter [LPF] 613). The band-limited output of first stage VGA 603 is serially coupled to a second stage VGA 605. The output from VGA 605 is coupled to multiplier and\or mixer 611, which also receives a periodic signal from a local oscillator (LO; not shown). The down-converted baseband output signal of multiplier and\or mixer 611 is provided to the input of third stage VGA 607. The output of VGA 607 is coupled to low pass filter (LPF) 613, which provides a band-limited output signal to fourth stage VGA 609. The analog output of VGA 609 is provided to ADC 621, which then converts the received signal into a digital signal, $V_{oR}$, at node 630. The signal at node 630 is provided to automatic gain control (AGC) circuit 623, which then provides a digital gain control signal $D_{agc}$ at node 640 to the plurality of VGAs (e.g., VGAs 603, 605, 607, and 609) in the receiver chain 650. Generally, $D_{agc}$ represents the gain of the receiver 650, which is the parameter value of interest. By utilizing $D_{agc}$, the gains of one or more of the plurality of VGAs (i.e., VGAs 603, 605, 607, and 609) can be adjusted until a target power $p_{trgt}$ is obtained at node 630, where $p_{trgt}$ is calculated according to Equation [9] below:

$$p_{trgt} = v_{oR}^2 \qquad [9]$$

and variable $v_{oR}$, equal to voltage $v_{oR}$ at node 630 in FIG. 5, can be calculated according to Equation [10] below:

$$v_{oR}^2 = 4kTB \prod_n a_n G_{Rn} \qquad [10]$$

where $a_n$ is the gain step deviation of the amplifiers in the receiver chain 650 (e.g., VGAs 603, 605, 607, and 609) due to process, supply voltage, and temperature (PVT) variations. Once AGC circuit 623 determines that a target power (e.g., $p_{trgt}$ of Equation [9] above) is provided at node 630, $D_{agc}$ can be calculated according to Equation [11] below:

$$D_{agc} = \prod_n a_n G_{Rn} \qquad [11]$$

where $G_{Rn}$ is defined as the gain of each of the plurality of amplifiers (e.g., VGAs 603, 605, 607, and 609) in the receiver chain 650, and $a_n$ is defined in accordance with Equation [10] above.

Rearranging Equations [9] through [11] provides Equation [12] below:

$$D_{agc} = \frac{P_{trgt}}{4kTRB} \qquad [12]$$

where $D_{agc}$ is a function of $p_{trgt}$, B is the bandwidth of the output signal from receiver chain 650 at node 620, T is the temperature (e.g., measured via an on-chip temperature sensor circuit) of the chip on which resistor 601 is located, and R is the resistance value of resistor 601 (e.g., calculated by using the voltage sampling circuit of FIG. 3A). Additionally, by sweeping the values of $p_{trgt}$, $a_n$ can be calculated for most gain settings of the receiver. Thus, by utilizing the present circuitry, all gain calibration measurements can be performed on-chip, thereby removing any need for manufacturing calibration (i.e., using external equipment such as automated test equipment) for gain characterization. During automated testing (e.g., ATE), system parameters such as gain, noise power, linearity, etc., are characterized. Based on the characterization of these system parameters, manufacturing calibration is performed (e.g., based on the measured gain from the ATE, correct gain coefficients are written into the chip). By implementing gain characterization on-chip, the automated testing characterization procedure can be skipped during ATE and/or manufacturing, and hence, ATE setup and measurement time can be saved, therefore reducing production costs.

A Third Circuit and/or Architecture for On-Chip Gain Calibration

FIG. 6 illustrates a third circuit for on-chip gain calibration 700. Specifically, once the gain of a receiver chain 745 is determined (e.g., by utilizing the circuitry 600 discussed above with respect to FIG. 5), the gain of the receiver chain 745 can be used to characterize the gain of a transmitter chain 735. By coupling the output 720 from a final stage amplifier 725 of the transmitter chain 735 to the input node of the receiver 745, one can determine the gain of the combined transmitter and receiver chains, and calculate therefrom the gain of the transmitter chain.

As illustrated, transceiver circuit 700 comprises a transmitter chain 735 that comprises a plurality of amplifiers 705, 715, and 725 connected in series. The transmitter chain 735 provides an output signal $V_{oT}$ at node 720. Specifically, transmitter chain 735 comprises N stages (i.e., N amplifiers), wherein VGA 705 is a first stage amplifier, VGA 715 is a second stage amplifier, and VGA 725 is a third (or $N^{th}$) stage amplifier. VGA 725 (e.g., the $N^{th}$ stage amplifier) provides a final stage output signal (e.g., $V_{oT}$) of the transmitter chain 735 at node 720.

To determine a gain of the transmitter chain 735 without utilizing an externally provided reference signal, one or more on-chip resistors can be coupled to an input of each amplifier stage in the transmitter chain 735. Although each amplifier stage 705, 715 and 725 is shown with two resistors (e.g., resistors 723 and 724, which can have different resistance values), embodiments in which a single resistor (e.g., as shown in FIGS. 2, 3B and 5) are also suitable. In one embodiment, one can determine the gain of each amplifier stage in the transmitter chain 735. Alternatively or additionally, one can determine the total gain of the transmitter chain 735.

Specifically, by closing switch 702 or 704, the on-chip resistors 701 or 703, respectively, provide a noise signal to the first amplifier 705. Bypass switch 755 can be closed, and a reference current (not shown) can be applied to the input node 710 of the transmitter chain 735, then the resistance of each of the on-chip resistors 701 and 703 can be determined, as discussed above. After characterizing the resistances of the on-chip resistors 701 and 703, bypass switch 755 is opened and the reference current is disconnected. Each of the switches 702 and 704 is sequentially closed, and the noise signal at 710 from the on-chip resistors 701 and 703 are sequentially coupled to the input of the amplifier stage 705 and amplified by the transmitter chain 735. The input impedance of the transmitter chain 735 can be determined using Equation [8] above (e.g., utilizing the parallel on-chip resistors 701 and 703) to derive two equations with two unknown values of $Z_{VGA,N}$ (the input impedance of the amplifier), and subsequently solving for $Z_{VGA,N}$ enables the calculation of the serial combination of transmitter chain 735 and receiver chain 745 after measuring the output of the ADC (not shown) in receiver chain 745. Once the total gain of the serial combination of transmitter chain 735 and receiver chain 745 is known, the gain of the transmitter chain 735 can be determined by deducting the gain of the receiver chain 745 from the total gain.

Similarly, after determining the resistances of on-chip resistors 721 and 723 and the input impedance at the third (or Nth) amplifier 725 (using a bypass switch and a reference current similar to that of FIG. 3B, but which are not shown in FIG. 6), by sequentially closing switches 722 and 724, the on-chip resistors 721 and 723, respectively, a noise signal is provided to the third (or Nth) amplifier 725 only. Using Equation [8] above to derive two equations with two unknown values of $Z_{VGA,3}$ for the third (or $Z_{VGA,N}$ for the Nth) amplifier 725, and subsequently solving for $Z_{VGA,3}$ for the third (or $Z_{VGA,N}$ for the Nth) amplifier 725, enables one to calculate the serial combination of the third (or Nth) amplifier 725 and receiver chain 745 after measuring the output of the ADC (not shown) in receiver chain 745. Deducting the gain of the receiver chain 745 from the total gain provides the gain of the third (or Nth) amplifier 725. The process described in this paragraph can be repeated for the second amplifier 715 (using switches 712 and 714 and on-chip resistors 711 and 713), and again for the first amplifier 715 (using switches 702 and 704 and on-chip resistors 701 or 703), thereby enabling calculation of the gain of each of the transmitter stages 705, 715, and 725. The total gain of transmitter chain 735 in this embodiment can be calculated by adding the individual gains of each amplifier 705, 715 and 725, or by subtracting the gain of the receiver chain 745 from the total gain of the serially-combined transmitter chain 735 and receiver chain 745.

A Method for On-Chip Gain Calibration

Figure 7:
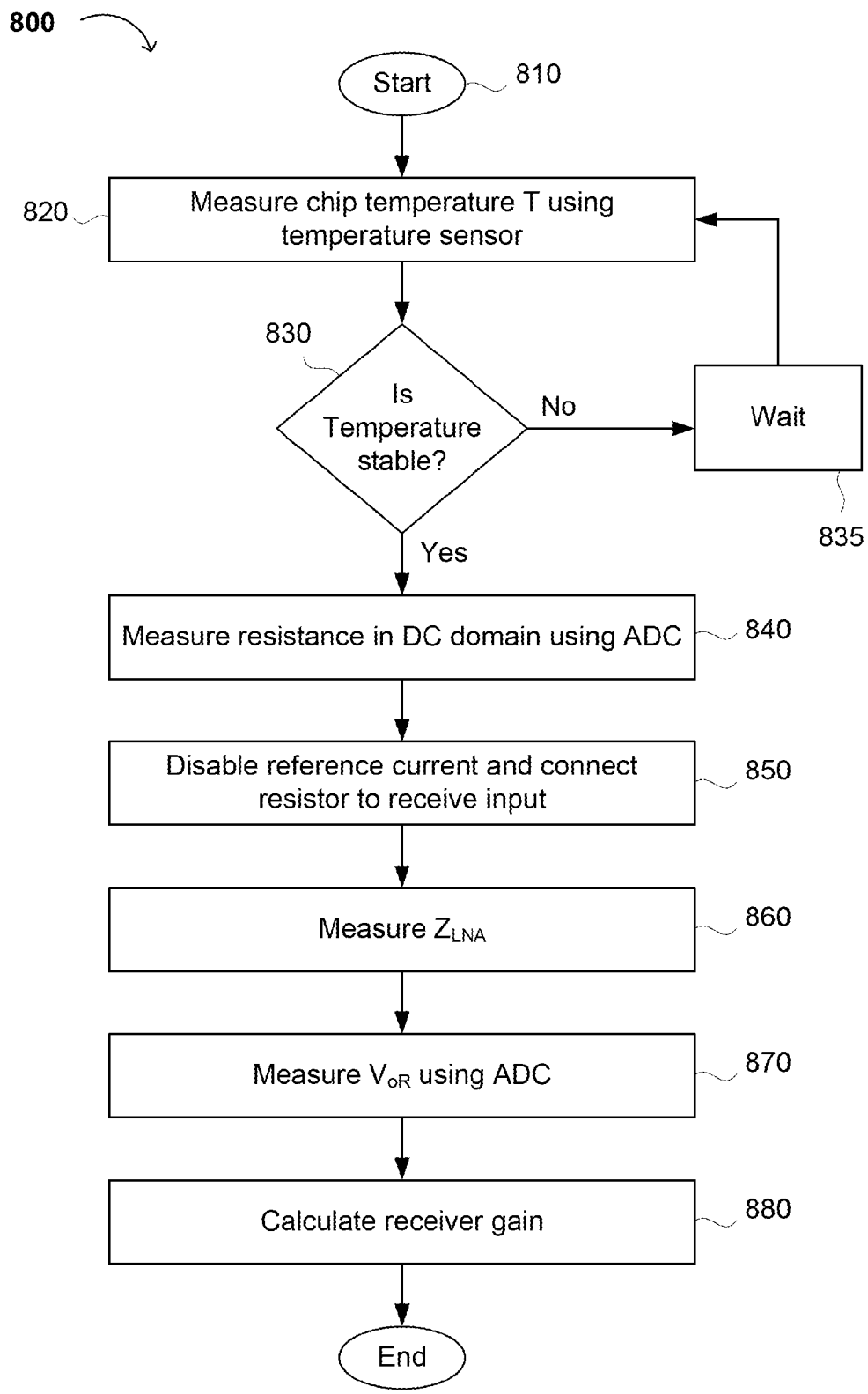
FIG. 7 is a flow diagram showing a first method of on-chip gain calibration using an on-chip resistor.

FIG. 7 shows a flowchart 800 illustrating a method of on-chip gain calibration of a receiver (e.g., in an RF transceiver). At 810, the method begins, and at 820, the chip temperature T is measured using an on-chip temperature sensor. At 830, a determination is made as to whether the chip temperature is stable. In one embodiment, the chip temperature is stable when it has remained at a substantially constant temperature for a predetermined length of time. If the chip temperature is not stable, at 835, after a predetermined waiting period or delay, the method returns to 820. Alternatively, the loop at 820, 830 and 835 can be continuous until the chip temperature is stable.

When the chip temperature is stable, at 840, the resistance of an on-chip calibration resistor (e.g., resistor 301 in FIG. 2, resistor 451 in FIG. 3B, or resistor 601 in FIG. 2) is measured in the DC domain, using an ADC (e.g., ADC 311 in FIG. 2, ADC 475 in FIG. 3B, or ADC 621 in FIG. 5), as described herein. For example, measuring the resistance of the calibration resistor can include connecting a reference current to an input node of the receiver chain (e.g., receiver chain 650 in FIG. 5), and sampling the voltage at the input of the receiver chain. In one embodiment, sampling the voltage at the input of the receiver chain comprises closing a bypass switch to an input of a voltage sampling circuit (e.g., the ADC of FIG. 3B), and measuring or determining the output of the voltage sampling circuit. In some embodiments, the method includes measuring the resistance of a second calibration resistor (e.g., resistor 531 in FIG. 4C) similarly to the first calibration resistor.

Thereafter, at 850, the reference current to the input node of the receiver disconnected, the bypass switch to the input of the ADC is opened, and a reference signal is generated by the on-chip resistor (e.g., on-chip resistor 301 in FIG. 2) and provided to the receiver chain. In an alternative embodiment, the on-chip resistor can be replaced with a diode. In one example, the reference signal is a thermal noise signal. In any case, the reference signal is generated by circuitry on the same die (or monolithic semiconductor substrate) as the receiver circuitry. The receiver chain can comprise any number of devices capable of being serially linked and providing amplification (e.g., LNAs, VGAs, BBAs, etc.).

At 860, the input impedance $Z_{LNA}$ of the receiver chain (e.g., the impedance at node 460 of FIG. 2) is measured, and at 870, a first voltage value ($V_{oR}$) is determined at the receiver output, as described herein. In a further embodiment, the impedance can be determined by further coupling a second on-chip resistor (different from the first on-chip resistor) to the input of the receiver chain and determining a second voltage value at the receiver output, and solving for the input impedance $Z_{LNA}$ of the receiver chain (e.g., at node 610 in FIG. 5) using the first and second voltage values (e.g., by solving for $Z_{LNA}$ in Equation [8] utilizing two equations and two unknowns). At 880, the gain of the receiver chain is determined. In one embodiment, the gain of the receiver chain is calculated using the equations discussed above (e.g., Equations [3]-[8]).

Figure 8:
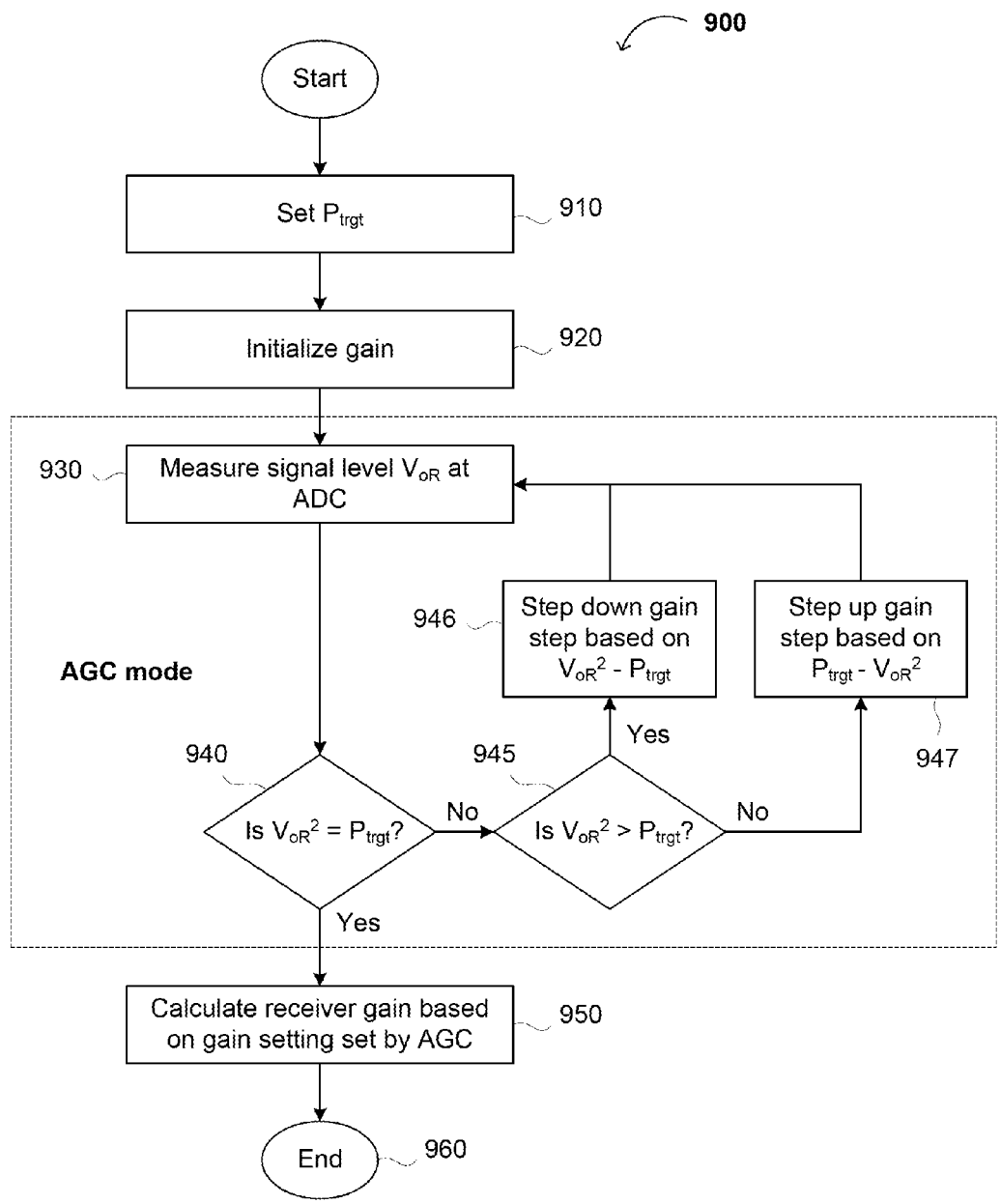
FIG. 8 is a flow diagram of a method for determining gain of a receiver with automatic gain control.

FIG. 8 shows an embodiment 900 for measuring the voltage ($V_{oR}$) at the receiver output and determining the gain $G_R$ of the receiver when the receiver employs automatic gain control (AGC). At 910, a target power $P_{trgt}$ is set or determined. At 920, the first gain measurement and/or calculation is performed (i.e., the gain is initialized), as described herein. In one embodiment, initializing the receiver comprises a first portion of the flow of FIG. 7 (e.g., from 810 to 860). Referring back to FIG. 8, at 930, the voltage of the receiver chain output (e.g., $V_{oR}$) is measured. The digital signal is then analyzed by the AGC circuit (e.g., AGC 623 in FIG. 5) at 940 to determine whether the square of the voltage of the receiver chain output $V_{oR}^2$ equals the target power $P_{trgt}$. If not, at 945, a determination is made whether the square of the voltage of the receiver chain output $V_{oR}$ is greater than the target power $P_{trgt}$.

If $V_{oR}^2 > P_{trgt}$, then the AGC circuit steps down the receiver gain at 946. If $V_{oR}^2 < P_{trgt}$, then the AGC circuit steps up the receiver gain at 947. The gain is then continually adjusted until a target power (e.g., $p_{trgt}$ of Equation [9]) is acquired at the output of the receiver chain (i.e., $V_{oR}^2 > P_{trgt}$). At 950, the receiver gain is calculated from the gain setting $D_{agc}$ from the AGC circuit (e.g., from the increase or decrease in gain applied by the AGC circuit). After 950, the method proceeds to 960 and ends.

A Second Method for On-Chip Gain Calibration

FIG. 9 shows a flowchart 1000 illustrating a second method of providing on-chip gain calibration for a transmitter chain in a transceiver (e.g., an RF transceiver). At 1010, the method begins (after the gain of the receiver chain is determined), and at 1020, a loopback path from the output of the transmitter chain (e.g., transmitter chain 735 in FIG. 6) to the input of the receiver chain is enabled. In one embodiment, enabling the loopback path comprises closing a switch coupling the output of the transmitter chain to the input of the receiver chain. At 1030 in FIG. 9, an on-chip gain characterization resistor (e.g., resistor 721 or 723 in FIG. 6) at an input of an Nth amplifier in the transmitter chain is enabled, generally by closing a switch (e.g., switch 722 or 724 in FIG. 6).

Referring back to FIG. 9, at 1040, the gain of the Nth amplifier is measured as described herein with regard to the embodiment of FIG. 6. In one embodiment, a reference signal is amplified by the Nth amplifier in the transmitter chain, then is amplified again by the receiver chain via the enabled loopback path, and the output of the receiver chain (e.g., at the ADC 311 in FIG. 2, ADC 475 in FIG. 3B, or ADC 621 in FIG. 5) is measured or determined. The reference signal is a thermal noise signal generated by the on-chip gain characterization resistor. After measuring or determining the gain of the Nth amplifier in the transmitter chain using the equations and circuits discussed above (e.g., Equations [3]-[8] and the voltage sampling circuit of FIG. 3), at 1050 in FIG. 9, the gain characterization resistor is disabled or otherwise disconnected from the input of the Nth amplifier.

At 1055, the method determines whether the gain of all of the transmitter amplifiers has been determined (i.e., when N=0). If the gain of all of the transmitter amplifiers has not been determined, the method proceeds to 1060 and repeats 1030, 1040 and 1050 for a next amplifier (i.e., the [N−1]th amplifier) in the transmitter chain. At 1055, if the method determines that the gain of all of the transmitter amplifiers has been determined, then the method ends at 1070. At 1070, the total gain of the transmitter chain (i.e., the sum of the gains of the amplifiers in the transmitter chain) has been determined.

The present disclosure also includes algorithms, computer program(s), computer-readable media, and/or software, implementable and/or executable in a general purpose computer or workstation equipped with a conventional digital signal processor, configured to perform one or more of the methods and/or one or more operations of the hardware disclosed herein. Thus, a further aspect of the methods relate to algorithms and/or software that implement a method for calibrating the gain of a receiver and, in some embodiments, a transmitter (e.g., in an RF transceiver). For example, the computer program or computer-readable medium generally contain a set of instructions which, when executed by an appropriate processing device (e.g., a signal processing device, such as a microcontroller, microprocessor or DSP device), are configured to perform the above-described method(s) and/or algorithm(s).

For example, the computer program may be on any kind of readable medium, and the computer-readable medium may comprise any medium (including non-transitory media) that can be read by a processing device configured to read the medium and execute code stored thereon or therein, such as a floppy disk, CD-ROM, magnetic tape or hard disk drive. Such code may comprise object code, source code and/or binary code. The code for implementing the present method(s) can comprise (but is not limited to) source code or object code, and can be digital. The code and/or instructions are generally configured for processing by a conventional digital data processor (e.g., a microprocessor, microcontroller, or logic circuit such as a programmable gate array, programmable logic circuit/device or application-specific [integrated] circuit).

CONCLUSION/SUMMARY

Thus, embodiments of the present disclosure provide circuits, architectures, systems, methods and algorithms for providing on-chip gain calibration, even in high noise, low gain environments. The present disclosure advantageously eliminates the measurement time, setup time and equipment costs associated with ATE measurements of receiver and transmitter gain. The present disclosure also advantageously provides accurate and reliable gain calibration for receivers and transmitter (e.g., in RF transceivers). Furthermore, the effects of temperature do not significantly affect the present gain calibration approach.

The foregoing descriptions of embodiments of the present disclosure have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A semiconductor die comprising a semiconductor substrate, wherein the semiconductor substrate comprises a receiver, and wherein the receiver comprises:
   a resistance element on the semiconductor substrate, wherein the resistance element is configured to provide a first signal;
   an amplifier circuit on the semiconductor substrate, wherein the amplifier is coupled to the resistance element, wherein the amplifier circuit comprises a plurality of amplifiers arranged serially, and wherein the amplifier circuit is configured to
      receive the first signal, and
      based upon the first signal, provide a second signal,
   an analog-to-digital converter on the semiconductor substrate, wherein the analog-to-digital converter is coupled to the amplifier circuit, and wherein the analog-to-digital converter is configured to convert the second signal to a digital signal; and
   an automatic gain control circuit on the semiconductor substrate, wherein the automatic gain control circuit is coupled to each of (i) the analog-to-digital converter and (ii) the amplifier circuit, wherein the automatic gain control circuit is configured to, based upon the digital signal, provide a digital gain control signal to the amplifier circuit,
   wherein the amplifier circuit is configured to, based upon the digital gain control signal, control a respective gain of the plurality of amplifiers of the amplifier circuit, wherein the first signal has a noise component that varies with temperature, and wherein the receiver further comprises a voltage sampling circuit configured to, based upon the first signal, determine a resistance value of the resistance element.

2. The semiconductor die of claim 1, wherein the voltage sampling circuit comprises:

a bypass path from an input to the amplifier circuit to an output of the amplifier circuit; and a switch in the bypass path.

3. The semiconductor die of claim 1, further comprising a temperature sensor configured to sense a temperature of the semiconductor die.

4. The semiconductor die of claim 1, wherein the resistance element comprises a resistor.

5. The semiconductor die of claim 1, wherein the amplifier circuit further comprises at least one of a multiplier and\or mixer in series with the plurality of amplifiers.

6. The semiconductor die of claim 1, wherein the amplifier circuit further comprises a low-pass filter in series with the plurality of amplifiers.

7. The semiconductor die of claim 1, wherein the resistance element comprises a first resistor and a second resistor in parallel with the first resistor, wherein the second resistor is different from the first resistor.

8. The semiconductor die of claim 7, wherein:

the first resistor has a first value;

the second resistor has a second value; and the first value is approximately twice the second value.

9. The semiconductor die of claim 1, wherein the plurality of amplifiers comprise one or more of a variable-gain amplifier, a low-noise amplifier, or a baseband amplifier.

10. The semiconductor die of claim 1, wherein the resistance element comprises one of (i) a diode or (ii) a transistor configured to receive a fixed voltage at a gate of the transistor.

* * * * *